United States Patent [19]

Cook et al.

[11] Patent Number: 4,818,596
[45] Date of Patent: Apr. 4, 1989

[54] WATERPROOF ARTICLE AND METHOD FOR MAKING A WATERPROOF ARTICLE

[75] Inventors: John A. Cook, Faringdon; Raymond W. Singleton, Cirencester, both of Great Britain

[73] Assignee: Scimat Limited, Swindon, United Kingdom

[21] Appl. No.: 220,994

[22] Filed: Jul. 13, 1988

Related U.S. Application Data

[63] Continuation of Ser. No. 88,621, Aug. 21, 1987, abandoned.

[30] Foreign Application Priority Data

Aug. 22, 1986 [GB] United Kingdom ............... 8620484

[51] Int. Cl.$^4$ .............................................. B32B 3/26
[52] U.S. Cl. .................................. 428/265; 427/43.1; 427/44; 427/55; 427/307; 428/315.5; 428/315.9
[58] Field of Search ................... 427/43.1, 44, 55, 307; 428/265, 315.5, 315.9

[56] References Cited

U.S. PATENT DOCUMENTS

| 3,425,981 | 2/1969 | Puletti et al. | 260/41 |
| 3,576,686 | 4/1971 | Schmidle et al. | 156/77 |
| 3,593,566 | 4/1976 | Gore | 254/288 |
| 3,770,537 | 11/1973 | Elton | 156/77 |
| 3,993,551 | 11/1976 | Assarsson et al. | 204/159.14 |
| 4,100,238 | 7/1978 | Shinomura | 264/49 |
| 4,230,463 | 10/1980 | Henis et al. | 55/16 |
| 4,239,714 | 12/1980 | Sparks et al. | 264/45.5 |
| 4,381,320 | 4/1983 | Nguyen | 427/44 |
| 4,613,544 | 9/1986 | Burleigh | 428/415.5 |

FOREIGN PATENT DOCUMENTS

| 2124798 | 3/1972 | Fed. Rep. of Germany . |
| 2339148 | 4/1975 | Fed. Rep. of Germany . |
| 1303897 | 1/1973 | United Kingdom . |
| 1325227 | 8/1973 | United Kingdom . |
| 1425318 | 2/1976 | United Kingdom . |
| 1481228 | 7/1977 | United Kingdom . |
| 1493654 | 11/1977 | United Kingdom . |
| 1538810 | 1/1979 | United Kingdom . |
| 2024100 | 9/1980 | United Kingdom . |

Primary Examiner—Marion C. McCamish
Attorney, Agent, or Firm—Herbert G. Burkard; Simon J. Belcher

[57] ABSTRACT

An article which is rendered waterproof by a microporous membrane of a hydrophobic material, the pores of the membrane in a layer-like region on or towards a surface thereof being plugged with a hydrophilic material, leaving hydrophobic material exposed on the said surface between the pores.

23 Claims, No Drawings

WATERPROOF ARTICLE AND METHOD FOR MAKING A WATERPROOF ARTICLE

This application is a continuation of application Ser. No. 088,621, filed Aug. 21, 1987 now abandoned.

The present invention relates to a waterproof article and to a method of making a waterproof article.

Articles for example fabrics for use in garments, footwear, tents or other shelters, paper or other fibrous material, and panels for use in building, may be rendered waterproof by means of a membrane of a polymeric material which covers the area of the article that is exposed to water, and which preferably is laminated thereto. In this context, the extent to which an article is waterproof can be determined by monitoring the pressure necessary to force water through the article, that is the water entry pressure (WEP). This may be measured using the Mullin's Burst Test (Fed. Std. 191, Method 5512), which involves clamping a test sample onto the top of a container filled with water by means of an annular ring. Pressure in the container may be increased using a piston, and a gauge may be used to monitor the pressure. The test procedure consists of raising the pressure of water to the test level over a period of approximately 10 seconds, and visually observing any leakage of water which may be forced through the sample. For high pressures, a metal screen may be positioned on the sample to support it and to prevent it from bursting. For some applications, an article which is capable of withstanding a test pressure of about 25 $kN.m^{-2}$ will be considered to be sufficiently waterproof, for example for applications where exposure to high water entry pressure is not encountered. For many applications, the ability to pass a higher test pressure will be desirable, for example about 60 $kN.m^{-2}$, preferably about 120 $kN.m^{-2}$, or more preferably about 172 $kN.m^{-2}$.

While waterproofness in itself is desirable, it can lead to discomfort due to build up of condensation on a surface of a waterproof article. Breathable waterproof articles have therefore been developed which allow passage of water-vapour while presenting a barrier to passage of liquid water, thus preventing build up of condensation. For example, U.S. Pat. No. 3,593,566 discloses a breathable waterproof fabric in which a microporous sheet of polytetrafluoroethylene (PTFE) is laminated to a fabric. The pores in the PTFE sheet allow passage of water-vapour but passage of liquid water is prevented owing to the highly hydrophobic nature of the material.

A problem with waterproof fabrics of the type disclosed in U.S. Pat. No. 3,593,566 is that surface tension lowering agents, such as certain constituents of perspiration, are deposited in the pores of the PTFE sheet with use, and can lead to the formation of channels through which liquid water can pass, and thus to the loss of waterproofness of the article.

A solution to this problem is disclosed in GB-A-No. 2024100 where a flexible layered article comprises a layer of porous hydrophobic material and a continuous hydrophilic layer attached to a face of the layer of hydrophobic material. The hydrophilic layer effectively acts as a filter allowing transmission of water vapour (by an absorption evaporation mechanism), but provides a barrier to surface tension lowering agents which, if allowed to come into contact with the layer of hydrophobic material, would affect its hydrophobic properties, leading eventually to wicking of liquid water through its pores.

In GB-A-No.2024100 the component layers are provided as discrete layers which are then attached, one to a face of the other, for example by means of spots of adhesive or by casting the hydrophilic material onto a surface of the layer of hydrophobic material. However, this type of construction suffers from the disadvantage that the bond between the layers can fail when the article is subjected to harsh physical treatment. Furthermore, the ability of such articles to transmit water vapour is impaired when the layers are bonded together by means of an adhesive since the area of the article available for water vapour transmission is reduced.

We have now devised a method of making a waterproof article and a waterproof article, in which discrete or interconnected plugs of hydrophilic material are provided in the pores of a microporous membrane of hydrophobic material, in such a way that hydrophobic material is left exposed on the surface of the membrane between the pores.

Accordingly, the invention provides an article which is rendered waterproof by a microporous membrane of a hydrophobic material, the pores of the membrane in a layer-like region on or towards a surface thereof being plugged with a hydrophilic material, leaving hydrophobic material exposed on the said surface between the pores.

In another aspect, the invention provides a method of making a waterproof article which comprises:
  (a) plugging the pores in a layer-like region on or towards a first surface of a microporous membrane of hydrophobic material, so that hydrophobic material is left exposed on the first surface between the pores; and
  (b) laminating the membrane with an article to be rendered waterproof.

The present invention has the advantage of providing a waterproof article which does not consist of discrete layers, attached one to a face of the other. The article therefore is not susceptible to delamination of hydrophilic material from the hydrophobic material, and furthermore, the ability of the article to transmit water vapour is not impaired by adhesive by which component layers of prior art articles are attached together. Indeed, according to the present invention, the hydrophilic material is provided just where it is required, that is at or towards the mouth of the pores, so as to plug the pores. It will be understood however that in many microporous membranes, it might not be possible to discern individual pores, the structure of the membrane being more like that of an open-cell foam. In such cases, plugs of hydrophilic material may be interconnected so that effectively, the hydrophilic material impregnates the hydrophobic membrane in a layer-like region.

In a preferred article, the membrane is such that there is no discernable boundary between the layer-like surface region of the membrane and the remainder thereof. In such a membrane the exposed faces of the layer-like region and of the remaining region will have different properties and/or compositions, but there will be a gradual change in properties and/or composition through the whole or a part of the thickness of the membrane. In such membranes, it will not be possible to discern the face of one region with which the other region is in contact. It will thus be understood that the term "layer-like" is used for convenience to denote a particular configuration of membrane in which the regions extend substantially parallel to a surface.

The article of the invention may be for example a waterproof fabric, waterproof paper or similar fibrous material or a waterproof building panel. The invention may be applied advantageously to waterproof fabrics for use in garments, footwear, tents and other protective structures or objects, in which the membrane is laminated with an appropriate fabric, which term includes sheets of woven or non-woven polymeric, synthetic or natural material.

Generally, the membrane will be laminated to the fabric or other material so that the plugged surface region thereof is remote from the fabric. The fabric is thus on the external surface of the membrane and is able to provide protection for the membrane from damage, such as from physical attack, and to provide a pleasing appearance to a garment that is made from the fabric. A layer of fabric or other material may be provided internally of the membrane, that is adjacent to the plugged surface region thereof, to protect the membrane, to improve the appearance of the article and also for the comfort of the user. Thus in the case of a garment, a particularly preferred construction of article consist of an outer layer of fabric laminated to the surface of the membrane remote from the plugged region, and an inner layer of fabric which functions as a lining.

A particularly preferred method of effecting the lamination is the subject of our copending application filed contemporaneously with this application Ser. No. 088,756, entitled Laminated Article and claiming priority from UK Patent Application No. 8620483. The disclosure of that application is incorporated herein by this reference. Briefly, the method disclosed therein comprises (a) laminating an article to be waterproofed with a sheet of material whose composition can be altered to render the material microporous, to cause the article and the sheet to bond directly together, and (b) altering the composition of the material of the sheet to render the sheet microporous. The method disclosed in the aforementioned copending application advantageously enables an article and a microporous membrane to be bonded directly together, that is to say independently of any adhesive which would tend to reduce the porosity of the membrane. This can enable a better controlled and more even porosity to be obtained in the finished waterproof article. Furthermore, the absence of adhesive allows waterproof articles to be made whose physical properties in extreme conditions, for example at extremes of temperature, are not limited by the properties of an adhesive layer. For example, articles made by this method may be used at low temperatures without problems of damage due to flexing caused by the low temperature characteristics of an adhesive layer.

The absence of adhesive also allows the laminated article to be used in media (such as solvents) and in contact with materials which might otherwise react with an adhesive layer, weakening the adhesive bond between the article and the membrane.

In a preferred method according to the invention, plugged pores in the layer-like surface region of a membrane are formed by selectively removing hydrophilic material from the opposite surface of a membrane precursor which comprises microporous hydrohobic material with hydrophilic material within, preferably filling, the pores. A membrane precursor which comprises hydrophilic material substantially filling the pores in hydrophobic material is preferably prepared by a melt-processing technique such as extrusion. The proportion of the components of such a membrane precursor may be varied according to the intended processing conditions and application. The ratio by weight of hydrophobic material to hydrophilic material will preferably be between 20:80 and 80:20. More preferably, the ratio is between 35:65 and 45:55 which has been found to give a satisfactorily high porosity, while being sufficiently easy to process to allow a thin film to be made.

Alternatively, a membrane of hydrophobic material may be made microporous prior to the introduction of hydrophilic material into its pores. For example the hydrophobic membrane may be formed initially by altering the compositon of a membrane, for example by removal of a component therefrom, or it may be formed by a physical treatment such as stretching or perforation. Preferably however, when the pores in the hydrophobic material are formed, they contain the hydrophilic material which, in effect, defines the pores. This may be acheived by forming the membrane of the hydrophobic and hydrophilic materials, for example as described above.

In the method of the invention, the step of laminating the membrane to the article which is to be rendered waterproof may be carried out before or after the step of forming the plugs in the pores is completed or carried out. Thus in one embodiment the membrane may be formed with a plugged layer-like region before being laminated to the article. However, particularly when the method involves removal of hydrophilic material as discussed above, the plugged region is preferably formed after lamination since the membrane can be less susceptable to damage during lamination while the removable hydrophilic material is still in the pores of the membrane.

Selective removal of hydrophilic material may be made possible by modification of the hydrophilic material so that its susceptibility to a removal treatment is less in the layer-like region of the membrane than in the remainder of the membrane. The method of the invention has the advantage that, by appropriate selection of the modification step, the transmission properties may be varied conveniently to suit the requirements of particular applications, in particular by varying the configuration and dimensions of the plugged and unplugged regions of the membrane. For example, deeper plugs may be obtained for applications where a higher water-entry pressure is desired.

The modification of the hydrophilic material will generally be administered to the membrane through one of its surfaces, with the depth of penetration being carefully controlled. The modification may involve selective reaction of the hydrophilic material with a reagant so as to change its susceptibility to a removal treatment. Alternatively, the hydrophilic material in selected regions may be subjected to irradiation treatment. Furthermore, the modification may comprise a combination of treatment with a reagant and with radiation. Treatment through a surface to form a layer-like region will tend to produce a membrane in which there is a gradual change in properties and/or composition through the whole or a part of its thickness, so that it will not be possible to discern a boundary between the layer-like region and the remainder of the film, or a face of one region with which the other region is in contact.

A preferred modification, to which the hydrophilic material at selected regions of the membrane may be subjected, comprises crosslinking the material at the selected regions. The selection of the regions may be achieved by rendering only selected regions crosslinkable when the membrane is subsequently subjected to a crosslinking treatment; for example selected regions may be treated with a composition which, when the membrane is subjected to a crosslinking treatment such as heating or irradiation, causes the hydrophilic material at the selected regions to become crosslinked. Alternatively, the treatment by which selected regions of the membrane are crosslinked may be one which is applied only to those selected regions; such as for example, limited penetration radiation. As a further alternative, selected regions may be treated with a crosslinking inhibitor, specifically to inhibit crosslinking at those regions.

Preferably, the modification to the hydrophilic material comprises treating the material in the layer-like region of the membrane with a composition which renders the material at that region crosslinkable, prior to subjecting the membrane to a crosslinking treatment. By careful administration of the composition, the region of the membrane which is treated may be selectively controlled. When crosslinking is effected by ultraviolet radiation, the composition will comprise a photosensitiser, and preferably also a crosslinking agent. An especially preferred composition comprises a solution of triallyl isocyanurate (TAIC) and benzophenone in a solvent such as toluene or methanol. The treatment may be selectively controlled by controlling the depth of penetration of the composition. This may be achieved for example by selecting the concentration of the active components (e.g. photoinitiator) in the composition, by selecting the time for whicn the hydrophilic material is subjected to the composition, or by a combination of these techniques.

The method of the invention preferably includes the step of exposing the membrane to radiation, for example to cause the hydrophilic material in the pores in the layer-like region of the membrane to become crosslinked. The radiation may comprise for example high energy electrons, or more preferably, ultraviolet radiation. The dimensions and configurations of the skin-like region may be controlled by controlling the irradiation dose, and penetration of the radiation. The use of irradiation with ultraviolet radiation and similar techniques has the advantage that crosslinking of the hydrophilic material in the vicinity of the membrane surface is inhibited to some extent by oxygen quenching of radicals. This ensures that the crosslinked hydrophilic material is recessed slightly within the pores of the membrane and therefore protected against physical damage. The extent to which the hydrophilic material is recessed from the first surface is restricted principally by the requirement that the hydrophobic nature of the opposite surface is not reduced.

The modifications to the hydrophilic material discussed above, are arranged to result in the material in the first layer-like surface region of the membrane being relatively unremovable, and the material in the remainder of the membrane being relatively removable. The proportion of removable and unremovable material will depend on the desired rate of fluid transmission through the membrane. Since generally the plugs are required to allow passage of water and similar fluids through the pores by an absorption evaporation mechanism (while acting as a barrier to other fluids), a relatively shallow plug will generally suffice. Indeed, it has been found surprisingly that the rate of transmission through a plug by such a mechanism is substantially unaffected by the depth of the plugs. However, by varying the depth of the plug, it is possible to vary the pressure required to force other fluids past the barrier presented by the plugs: a deeper plug will withstand a higher fluid entry pressure. In a preferred embodiment, the membrane has not more than about 60%, preferably not more than about 40%, especially from about 0.5% to 25%, by weight of the initial weight of hydrophilic material remaining in the pores after substantially all of the relatively removable material has been removed.

By crosslinking the hydrophilic material at selected regions of the membrane, several physical properties of a hydrophilic material may be altered, one or more of which may be relied on to provide the basis for a selective removal treatment. For example, the solubility of the hydrophilic material in a solvent can be reduced by crosslinking; such modification of the hydrophilic material, in comination with a removal treatment which comprises treating the membrane with a solvent in which the plugging material at the (or each) first region of the membrane is soluble, is a particularly preferred method.

The removal treatment by which hydrophilic material is removed from the membrane, leaving plugs of the hydrophilic material in the pores in the layer-like surface region of the membrane, may involve treatment of the membrane with a reagent, such as a solvent, or it may be independent of reagant contact, for example by heating. In either case, the treatment may involve reaction or decomposition of the hydrophilic material. For example, the hydrophilic material may be removed after, or as a result of, degradation by treatment with irradiation or by ultrasonic treatment. Alternatively, the hydrophilic material may be removed or rendered removable by reaction with one or more reactants. Preferably however, the removal treatment comprises treating the membrane with a solvent in which the removable hydrophilic material is soluble.

By the term "hydrophobic", as applied to the material of the microporous membrane, is meant that the material is unwettable, having a water contact angle of more than 90 degrees, and such that water will not spread on the material or wick into the porous structure of the membrane. Polymeric materials are preferred since they can conveniently be formed into a microporous membrane, but where desired, it is envisaged that other materials, such as metallic or inorganic materials, may be used.

Polymeric hydrophobic materials which may be used include:
  Polymers of ethylenically unsaturated hydrocarbons having from 2 to 12 carbons such as ethylene, propylene, butadiene and 4-tert butyl styrene. Copolymers of these materials are also useful, for example ethyleneproplylene copolymers; and
  Fluoropolymers, in particular ethylene-tetrafluoroethylene copolymer (Tefzel TM) and polychlorotrifluoroethylene (Halar TM).

Factors relevant to the selection of the hydrophilic material include the application to which the waterproof article is to be put, other substances with which the article will come into contact when in use, and the nature of the modification and the removal treatment, if used in its manufacture. For example when the article is for use as a garment, it will be important that the hydrophilic material be a non-irritant to skin; and when the article is for use in medical application, the hydrophilic material will desirably be biologically inactive (although beneficial activity is not excluded).

It is preferred that the hydrophilic material be polymeric, particularly when the hydrophobic material is also polymeric. Certain polymeric hydrophilic materials can be modified conveniently by crosslinking as described above. Furthermore, when both the hydrophobic and hydrophilic materials are polymeric, a blend thereof can conveniently be formed into a membrane by extrusion, although such a process can also be employed to make membranes in which the hydrophilic material is not polymeric.

When the removal treatment comprises treating the membrane with a solvent, the hydrophilic material will generally be selected to be soluble in the solvent. Soluble polymers are preferred. When water or another aqueous based solvent is selected as the solvent (which is generally preferred for convenience), the plugging material may be selected from the following list (which is not exhaustive):

alkylene oxide homo- and copolymers.
vinyl alcohol homo- and copolymers.
vinyl pyrrolidone homo- and copolymers.
acrylic acid homo- and copolymers.
methacrylic acid homo- and copolymers.

Certain naturally occurring polymers such as polysaccharides may also be used as the hydrophilic material for certain applications.

Particularly preferred materials are ethylene oxide polymers, such as that sold under the Trade Mark Polyox. The use of ethylene oxide polymers as the hydrophilic material is advantageous since they are water soluble and melt-processable.

When the article of the invention is required to allow passage of water vapour, that is to be breathable, for example for use as a garment, the arrangement of the pores and of the hydrophilic material will preferably be such that its moisture vapour transmission rate is at least 1000 g.m$^{-2}$.day$^{-1}$, especially at least 2000 g.m$^{-2}$.day$^{-1}$, measured using ASTM-E96-66B, modified as described below.

Approximately 80 cc of water is placed in a tapered polypropylene cup which is 11.5 cm high with a 6.5 cm diameter mouth. The material to be tested is sealed to the lip of the cup with a silicone adhesive. The cup assembly is weighed to the nearest 1/100 gram and an elastic rubber collar is placed on the cup under tension. In an environmental chamber, the assembly is suspended upside down through a circular opening in a support place, its position being adjusted by means of the rubber collar so that the mouth of the cup is aligned with the lower surface of the plate. Between this surface and the bottom of the chamber there is an approximately 10.0 cm air space across which air is caused to flow at about 200 m,min$^{-1}$. The chamber is held at a temperature of 23° C. ±1° C. and a relative humidity of 50%±2%. The sample remains in the chamber for three hours and is then removed and weighed again to within 1/100 of a gram. The moisture vapour rate is then expressed in grams of water lost per square metre of sample surface area per 24 hours.

EXAMPLES

40 Parts w/w medium density polyethylene (Sclair 8405 TM from Du Pont) and 60 parts w/w polyethylene oxide (Polyox WSRN 705 TM from Union Carbide) were compounded using a Baker Perkins twin screw extruder. The compound was then blown into a 100 micron thick membrane using conventional blown polymer film techniques. The die gap was 0.65 mm and the die temperature 210° C. The blow ratio was 2.1. The film was then reduced in thickness to 50 micron by passing it between 30 cm diameter rolls at a temperature of 85° C. The force exerted by the rolls on the membrane was 0.84 kg per linear centimeter.

The polyethylene oxide in a surface region of a membrane (area 8 cm× 10 cm) was crosslinked by spraying a solution of photoinitiator onto the surface of the membrane, and then exposing the treated surface region to ultraviolet radiation. The radiation source was a 15.4 cm 500 W medium pressure mercury vapour lamp (Hanovia Type UVS 500).

The treated membranes were immersed in water to extract the non-crosslinked polyethylene oxide, and the membranes were dried. The weight loss resulting from the extraction was measured. The moisture vapour transmission rate and water entry pressure of the finished membranes were measured using the methods described above.

EXAMPLE 1

Photoinitiator solution: 3.5% w/w benzophenone in methanol

UV lamp to membrane distance: 30 cm.

TABLE 1

| UV Exposure Time (minutes) | Weight Loss on Extraction (%) | MVTR (kg · m$^{-2}$ · day$^{-1}$) |
| --- | --- | --- |
| 0 | 59.3 | 10.1 |
| 5 | 54.3 | 13.6 |
| 10 | 49.3 | 9.3 |

EXAMPLE 2

Photoinitiator solution: 3.5% w/w benzophenone in acetone

UV lamp to membrane distance: 30 cm.

TABLE 2

| UV Exposure Time (minutes) | Weight Loss on Extraction (%) | MVTR (kg · m$^{-2}$ · day$^{-1}$) |
| --- | --- | --- |
| 0 | 59.5 | 10.1 |
| 1 | 58.9 | — |
| 3 | 54.0 | — |
| 5 | 54.1 | 11.1 |
| 10 | 49.8 | 9.9 |

EXAMPLE 3

Photoinitiator solution: 3.5% w/w benzophenone in 1:1 propan-2-ol/water

UV lamp to membrane distance: 30 cm.

TABLE 3

| UV Exposure Time (minutes) | Weight Loss on Extraction (%) | MVTR (kg · m$^{-2}$ · day$^{-1}$) |
| --- | --- | --- |
| 0 | 59.3 | 10.1 |
| 5 | 57.0 | 9.7 |
| 10 | 52.1 | 11.7 |

EXAMPLE 4

Photoinitiator solution: 3.5% w/w benzophenone and 5% w/w TAIC in acetone

UV lamp to membrane distance: 30 cm.

TABLE 4

| UV Exposure Time (mins.) | Weight Loss on Extraction (%) | MVTR (kg·m$^{-2}$·day$^{-1}$) | Water Entry Pressure (kN·m$^{-2}$) |
|---|---|---|---|
| 0 | 58.5 | 9.7 | 21 |
| 2 | 54.3 | 12.9 | 83 |
| 5 | 46.8 | 17.8 | >172 |
| 10 | 38.6 | 15.0 | >172 |

The effect of TAIC on cross-linking the polyethylene oxide can be seen by comparing this data with that in the previous examples. The effect of increasing the amount of retained polyethylene on the water entry pressure is also clearly demonstrated.

EXAMPLE 5

Photoinitiator solution: 3.5% w/w benzophenone and 5% w/w TAIC in toluene.
UV lamp to membrane distance = 10 cm.

TABLE 5

| UV Exposure Time (mins.) | Weight Loss on Extraction (%) | MVTR (kg·m$^{-2}$·day$^{-1}$) | Water Entry Pressure (kN·m$^{-2}$) |
|---|---|---|---|
| 0 | 58.2 | 10.1 | 28 |
| 0.5 | 34.6 | — | >172 |
| 1 | 27.6 | 14.5 | >172 |
| 2 | 26.8 | — | >172 |

EXAMPLE 6

Continuous lengths of membrane can be treated with UV radiation as follows. A polymer membrane, made according to the method described above, was sprayed with a solution of 3.5% w/w benzophenone and 5% w/w TAIC in toluene, immediately before passing at a rate of 0.28 m. min$^{-1}$ under the UV source described above. The distance between the membrane and the UV lamp was 10 cm and the exposure time of any part of the film was 38 seconds. The weight loss on extraction of non-crosslinked polyethylene oxide has been found to be 43%. The MVTR was 9.0 kg.m$^{-2}$.day$^{-1}$ and the water entry pressure was greater than 172 kN.m$^{-2}$.

EXAMPLE 7

To demonstrate the barrier properties of the membrane, the MVTR was measured using pure water and an aqueous solution of 0.1% w/w lithium dodecyl sulphate. The MVTR of membranes which had been extracted without UV treatment were also measured. The results are shown in table 6:

TABLE 6

| Sample | Test Solution | MVTR (kg m$^{-2}$ day$^{-1}$) |
|---|---|---|
| Treated | Water | 9.0 |
| Treated | Water/surfactant | 9.6 |
| Untreated | Water | 8.0 |
| Untreated | Water/Surfactant | 30.0 |

The results show that the surfactant solution causes a very large apparent increase in the MVTR for the untreated film due to the solution completely wetting out the membrane. In contrast, the treated membrane showed no signs of wetting out with the surfactant solution with the consequence that no increase in MVTR was observed.

EXAMPLE 8

A waterproofed fabric was made in a continuous process by laminating a polymer membrane with a 54 g.m$^{-2}$ non-waterproofed nylon fabric (Pertex 4 ™). The lamination process involved sandwiching the polymer membrane between the fabric layer and a layer of silicon release paper, and then passing the layers between 30 cm diameter rolls at a temperature of 130° C. The force exerted by the rolls was 0.84 kg.linear cm$^{-1}$. After removal of the release paper, the membrane was treated with a solution of benzophenone and TAIC in toluene, and then with UV radiation, as described above. The MVTR for the laminate was 17.3 kg m$^{-2}$ day $^{-1}$. The water entry pressure was greater than 172 kN.m$^{-2}$.

We claim:

1. An article which is rendered waterproof by a microporous memberane of a hydrophobic material, the pores of the membrane in a layer-like region on or towards a surface thereof being plugged with a hydrophilic material, leaving hydrophobic material exposed on the said surface between the pores.

2. An article as claimed in claim 1, in which the membrane is laminated with a fabric.

3. An article as claimed in claim 2, in which the plugged layer-like region of the membrane is on the surface remote from the fabric.

4. An article as claimed in claim 2, in which the said fabric is the article that is rendered waterproof by the microporous membrane.

5. An article as claimed in claim 1, which forms at least part of a garment, an item of footwear, or a tent or other shelter.

6. An article as claimed in claim 1, in which at least on the surface of the membrane remote from the plugged layer-like region, the advancing water contact angle of the membrane is more than 90 degrees.

7. An article as claimed in claim 6, in which the hydrophobic material of the membrane comprises polyethylene.

8. An article as claimed in claim 1, in which the hydrophilic material is a homo- or copolymer of an alkylene oxide.

9. An article as claimed in claim 8, in which the hydrophilic material comprises a polyethylene oxide.

10. A method of making a waterproof article, which comprises:
   (a) forming plugs of hydrophilic material in the pores in a layer-like region on or towards a first surface of a micorporous membrane of hydrophobic material, so that hydrophobic material is left exposed on the first surface between the pores; and
   (b) laminating the membrane with an article to be rendered waterproof.

11. A method as claimed in claim 10, in which step (b) is carried out before step (a).

12. A method as claimed in claim 10, in which the plugged pores are formed in the layer-like region on the first surface of the membrane by selectively removing hydrophilic material from the opposite surface of a membrane which comprises microporous hydrophobic material with hydrophilic material within the pores.

13. A method as claimed in claim 12, in which the hydrophilic material is removed from the said opposite surface of the membrane by treatment with a solvent in which the hydrophilic material at that surface of the membrane is soluble.

14. A method as claimed in claim 12, in which the membrane which comprises microporous hydrophobic material with hydrophilic material within the pores is formed by a melt-processing technique.

15. A method as claimed in claim 10, which includes the step of modifying the hydrophilic material so that its susceptibility to the removal treatment is less in the skin like region of the membrane than in the remainder of the membrane.

16. A method as claimed in claim 15, in which the modification step comprises crosslinking the hydrophilic material in the skin-like region of the membrane.

17. A method as claimed in claim 16, in which the modification step comprises treating the hydrophilic material in the layer-like region of the membrane with a composition which renders the hydraphilic material in that region crosslinkable.

18. A method as claimed in claim 11, in which the composition comprises a photosensitiser and a crosslinking agent.

19. A method as claimed in claim 18, which includes exposing the membrane to ultraviolet radiation.

20. A method as claimed in claim 10, in which the article and the membrane are laminated with one another by the application thereto of a pressure of at least about 2 N. linear $cm^{-1}$.

21. A method as claimed in claim 10, in which the article and the membrane are laminated with one another at an elevated temperature.

22. A method of making a waterproof article, which comprises:
  (a) laminating an article to be rendered waterproof with a membrane comprising microporous hydrophobic material with hydrophilic materail within the pores, to cause the article and the membrane to bond directly together;
  (b) removing hydrophilic material from a surface region of the membrane to form plugs of hydrophilic material in the pores in a layer-like region at or towards the opposite surface of the membrane, leaving hydrophobic material exposed on the said opposite surface between the pores.

23. A method as claimed in claim 22, which includes the step of crosslinking the hydrophilic material in the layer-like region of the membrane so that the susceptibility of the hydrophilic material to removal is less in that region than in the remainder of the membrane.

* * * * *